United States Patent
Clegg et al.

(10) Patent No.: US 7,490,795 B2
(45) Date of Patent: Feb. 17, 2009

(54) AIRCRAFT EVACUATION SLIDE WITH PRIMARY GAS RELIEF VALVE

(75) Inventors: Andrew Clegg, Phoenix, AZ (US); David M. Whittingham, Phoenix, AZ (US); Peter P. Seabase, Cuyahoga Falls, OH (US)

(73) Assignee: Goodrich Corporation, Charlotte, NC (US)

( * ) Notice: Subject to any disclaimer, the term of this patent is extended or adjusted under 35 U.S.C. 154(b) by 604 days.

(21) Appl. No.: 11/217,147

(22) Filed: Aug. 31, 2005

(65) Prior Publication Data

US 2007/0045473 A1  Mar. 1, 2007

(51) Int. Cl.
  *B64C 1/22* (2006.01)
  *B64D 1/08* (2006.01)
  *B64D 9/00* (2006.01)

(52) U.S. Cl. ............... 244/137.2; 244/905; 137/587; 182/48

(58) Field of Classification Search ............... 244/137.1, 244/137.2, 905; 182/48; 137/596, 587, 589, 137/624.11
See application file for complete search history.

(56) References Cited

U.S. PATENT DOCUMENTS

| | | | |
|---|---|---|---|
| 3,731,843 A | 5/1973 | Anderson, Jr. | |
| 4,213,635 A | 7/1980 | Inokuchi et al. | |
| 4,368,009 A * | 1/1983 | Heimovics et al. | 417/191 |
| 4,969,482 A * | 11/1990 | Perrin et al. | 137/76 |
| 5,459,699 A * | 10/1995 | Walter | 367/142 |
| 5,820,162 A | 10/1998 | Fink | |
| 6,240,951 B1 * | 6/2001 | Yori | 137/224 |
| 6,486,771 B1 * | 11/2002 | Fuller et al. | 340/442 |
| 7,032,778 B2 | 4/2006 | Bock et al. | |
| 2003/0080254 A1* | 5/2003 | Alberts | 244/137.2 |
| 2004/0074696 A1* | 4/2004 | Horvath et al. | 182/48 |

* cited by examiner

*Primary Examiner*—Michael R Mansen
*Assistant Examiner*—Valentina Xavier
(74) *Attorney, Agent, or Firm*—Jerry J Holden; John D. Titus

(57) ABSTRACT

An emergency evacuation slide system includes a control valve having a normally-open vent that closes after a predetermined period of time calculated to vent excess inflation gas produced by the gas generator. In operation, in the event of an aircraft emergency exit door being opened in the "armed" condition, the primary valve member of the control valve is opened allowing inflation gas to flow into the valve chamber. A portion of the gas entering the chamber is vented through the normally-open vent. After a predetermined period of time calculated to be sufficient to vent the excess inflation gas, the normally-open valve is closed to divert 100% of the remaining inflation gas into the evacuation slide.

15 Claims, 3 Drawing Sheets

AIRCRAFT EVACUATION SLIDE WITH PRIMARY GAS RELIEF VALVE

BACKGROUND OF THE INVENTION

This invention relates to emergency evacuation equipment for aircraft, in particular to an inflation device for inflating an inflatable aircraft evacuation slide or other inflatable device.

The requirement for reliably evacuating airline passengers in the event of an emergency is well known. Emergencies at take-off and landing often demand swift removal of passengers from the aircraft because of the potential for injuries from fire, explosion, or sinking in water. A conventional method of quickly evacuating a large number of passengers from an aircraft is to provide multiple emergency exits, each of which is equipped with an inflatable evacuation slide. Current state of the art emergency evacuation slide systems comprise an inflatable evacuation slide that is stored in a folded, uninflated state together with a source of inflation gas. The source of inflation gas typically comprises a gas generator, stored compressed gas, or a combination thereof. Pyrotechnic gas generators have an advantage in that they are small, lightweight, and produce a high volume of gas, however, the high temperature gas produced by a gas generator alone can cause numerous problems including sagging of the evacuation slide as the inflation gas cools and, in some cases melting or scorching of the fabric out of which the inflation slide is fabricated. Use of stored compressed gas by itself, although simple, implicates a weight penalty that must be paid for carrying a pressure vessel having sufficient capacity (in terms of volume and pressure) to inflate the evacuation slide over the wide operational temperature range specified for such slides. Additionally, where only a compressed gas is used to inflate the evacuation slide, a large drop in temperature occurs as the gases expand, often causing ice to form, which can block the flow of gas. Accordingly, state of the art emergency evacuation slide systems typically comprise a hybrid inflator, which utilizes a stored compressed gas together with a pyrotechnic gas generator. The pyrotechnic gas generator augments the stored compressed gas by providing additional gas as well as heat to counteract to effects of the expansion-induced cooling of the compressed gas as it expands out of the pressure vessel.

To further augment the volume of gas delivered to the evacuation slide, many evacuation systems utilize aspirators such as that disclosed in U.S. Pat. No. 4,368,009 to Heimovics, et al. As the compressed gas flows through the aspirator, a venturi draws additional air into the aspirator to pump about two to three times as much gas into the evacuation slide as is supplied by the gas source alone.

Despite these advances, there still exists problems due to the wide ambient temperature range over which these inflation systems are required to operate, typically from −65° F. to +165° F. The amount of gas available must be enough to pressurize the evacuation slide at the coldest temperature. Because of the relationship between pressure and temperature within a fixed volume, however, as the ambient temperature rises above the minimum, the pressure within the pressure vessel rises proportionately. Accordingly, at higher temperatures, the inflation system produces substantially more gas than is necessary to inflate the evacuation slide. To prevent overpressurization and possible rupturing of the inflatable evacuation slide, provisions must be made to vent the excess inflation gas. Additionally, certain evacuation slides, such as extensible slides, require a substantially greater volume of gas when deployed in their extended configuration than when deployed in their foreshortened configuration. The excess inflation gas necessary to inflate the slide in its extended configuration must be vented when the slide is deployed in its foreshortened configuration A conventional method of venting the excess inflation gas is to provide several pressure relief valves in the inflatable slide itself. Pressure relief valves, however, add significant weight to the inflatable evacuation slide and add substantial volume to the inflatable slide in its uninflated, stored condition. According to U.S. Pat. No. 6,240,951 to Yori and assigned to the assignee of the present invention, excess inflation gas may be vented by means of a regulator valve that includes an active waste gate, which vents excess gas as the pressure in the outlet port of the regulator valve rises. Although the valve of Yori accomplishes the function of venting excess inflation gas it does so at the cost of substantial complexity and cost.

Accordingly, what is needed is a simple and inexpensive control valve for an aircraft emergency evacuation slide that reliably vents excess inflation gas thereby eliminating or reducing the number of pressure relief valves required in the slide itself.

SUMMARY OF THE INVENTION

The present invention comprises a control valve having a normally-open vent that closes after a predetermined period of time calculated to vent the required excess gas. According to an embodiment of the invention, the control valve comprises an inlet port in fluid communication with the pressure vessel containing the stored inflation gas, a primary valve member closing the inlet port, a primary outlet port in fluid communication with the inflatable evacuation slide and a chamber leading from the inlet port to the primary outlet port. The chamber includes a gas release outlet that is normally-open. In operation, in the event of an aircraft emergency exit door being opened in the "armed" condition, the primary valve member is opened allowing inflation gas to flow into the chamber. A portion of the gas entering the chamber is vented through the normally-open vent. After a predetermined period of time calculated to be sufficient to vent the excess inflation gas, (based on the pre-initiation temperature or pressure of the pressure vessel) the normally-open valve is closed to divert 100% of the remaining inflation gas into the evacuation slide. In another embodiment, the normally-open valve is closed to divert inflation gas into an extensible evacuation slide in order to deploy the slide in its fully extended mode (where, as a result of the increased slide length, an increased volume of gas is required)

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
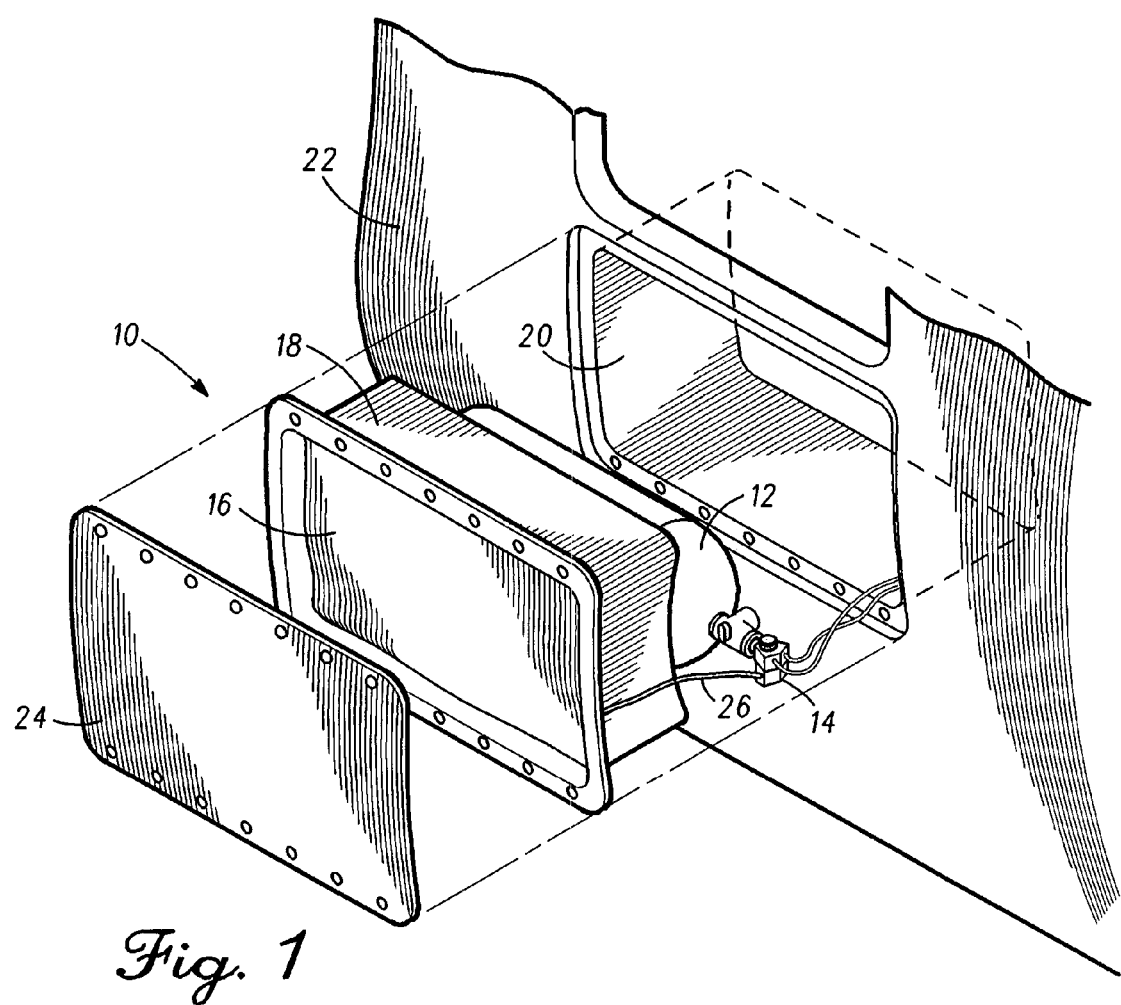
FIG. 1 is an exploded perspective view showing an inflation system incorporating features of the present invention.

The drawing figures are intended to illustrate the general manner of construction and are not necessarily to scale. In the detailed description and the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to FIG. 1, an inflatable aircraft evacuation slide system 10 incorporating features of the present invention comprises a pressure vessel 12 containing pressurized inflation gas, a control valve 14 and an inflatable evacuation slide 16 stored in an uninflated condition within in a packboard compartment 18. Packboard compartment 18 is secured within a recess 20 in the outer hull of aircraft 22 and covered by a cover panel 24. Pressure vessel 12 further includes a pyrotechnic gas generator (not shown) that heats and augments the stored inflation gas within pressure vessel 12. In normal operation, the opening of the aircraft emergency evacuation exit door in the armed condition causes a signal to be sent to control valve 14 causing control valve 14 to open allowing inflation gas to flow from pressure vessel 12 into inflation line 26 to operate the locks allowing cover panel 24 to fall away and to inflate inflatable evacuation slide 16. Simultaneously, the gas generator is initiated to augment and heat the stored inflation gas flowing out of pressure vessel 12. As noted hereinbefore, when evacuation slide system 10 is initiated at an elevated temperature, substantial excess inflation gas is produced due to the combined thermal effects of the ambient temperature and the pyrotechnic gas generator. Accordingly, in addition to functioning as the primary valve between the source of inflation gas and the inflatable evacuation slide, control valve 14 further acts to vent the appropriate portion of the excess inflation gas as more fully described hereinafter.

Figure 2:
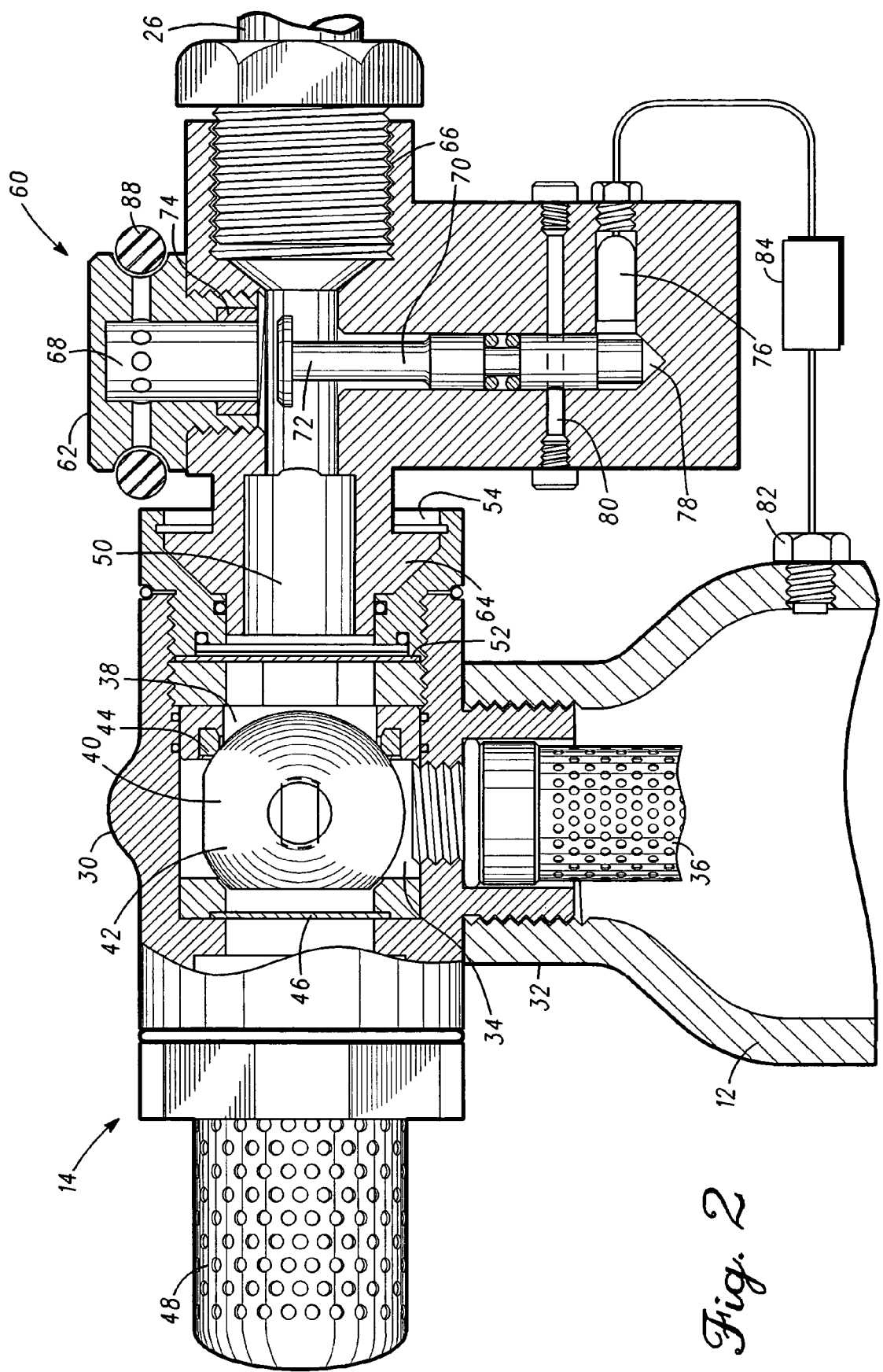
FIG. 2 is a cross-sectional view of a control valve for use in the evacuation slide system of FIG. 1.

With reference to FIG. 2, control valve 14 comprises a valve body 30 attached to the outlet 32 of pressure vessel 12. Valve body 30 includes a first chamber 34 that is in fluid communication with vessel 12 via an inlet filter 36. First chamber 34 is sealed from a second chamber 38 by means of a primary valve 40 composed of a ball member 42 that seated against a valve seat 44. First chamber 34 has an overpressure exhaust vent that is sealed by means of an overpressure burst disk 46. Overpressure burst disk 46 ruptures in the event pressure in first chamber 34 exceeds a predetermined safe pressure and vents the overpressure to the atmosphere through a neutral thrust diffuser 48. Second chamber 38 is separated from a third chamber 50 by means of a secondary valve member which in the illustrative embodiment comprises a burst disk 52.

Control valve 14 further comprises a primary relief valve assembly 60. Primary gas relief valve assembly 60 comprises a valve body 62 having an inlet port 64 that connects with outlet port 54 of valve body 30 to form third chamber 50. Valve body 62 further comprises a primary outlet port 66 connecting control valve 14 to inflation line 26, and a gas relief outlet 68 that vents third chamber 50 to the atmosphere. Gas relief outlet 68 is normally open, but may be sealed by a normally-open valve 70 comprising poppet valve 72 and valve seat 74. Normally-open valve 70 is moved from an open position to a closed position by means of an electro-explosive device 76 which, when initiated, generates pressure in chamber 78 that forces poppet valve 72 to shear pin 80 and seat against valve seat 74. Gas relief outlet 68 further includes an O-ring 88 for excluding dirt from entering the gas relief outlet 68.

In normal operation, when the aircraft emergency evacuation exit is opened in the armed condition an electro-explosive device (not shown) opens primary valve 40 by rotating ball member 42 off its seat 44, allowing pressure to flow from first chamber 34 into second chamber 38. Rising pressure in second chamber 38 causes burst disk 52 to rupture allowing inflation gas to flow from second chamber 38 into third chamber 50. The majority of the inflation gas enters inflation line 26 to immediately operate the locks to release cover panel 24 and begin inflation of inflatable evacuation slide 16, however, a portion of the inflation gas is vented through gas relief outlet 68.

A sensor 82 monitors environmental conditions such as aircraft attitude and/or height of the exit door for purposes of deploying an extensible slide in the elongated or foreshortened configuration. Alternatively, in order to prevent overinflation of either an extensible slide or a conventional non-extensible slide due to temperature effects, sensor 82 measures the ambient pressure within pressure vessel 12 up to the moment inflatable evacuation slide system 10 is initiated. This is accomplished either by monitoring pressure directly or by monitoring temperature as a proxy for pressure based on the known relationship between pressure and temperature for a fixed volume of gas. Based upon the pre-initiation ambient conditions within pressure vessel 12, a time delay is calculated which is equal to a prediction of the time necessary to vent precisely the correct amount of excess inflation gas. The time delay is then stored by control circuit 84. After the predetermined period of time has elapsed following opening of primary valve 40, control circuit 84 initiates electro-explosive device 76, which forces normally open valve 70 into its closed position. Pressure within third chamber 50 as well as any residual pressure in chamber 78 then maintains normally-open valve 70 in its closed position for the duration of the evacuation slide inflation process.

Figure 3:
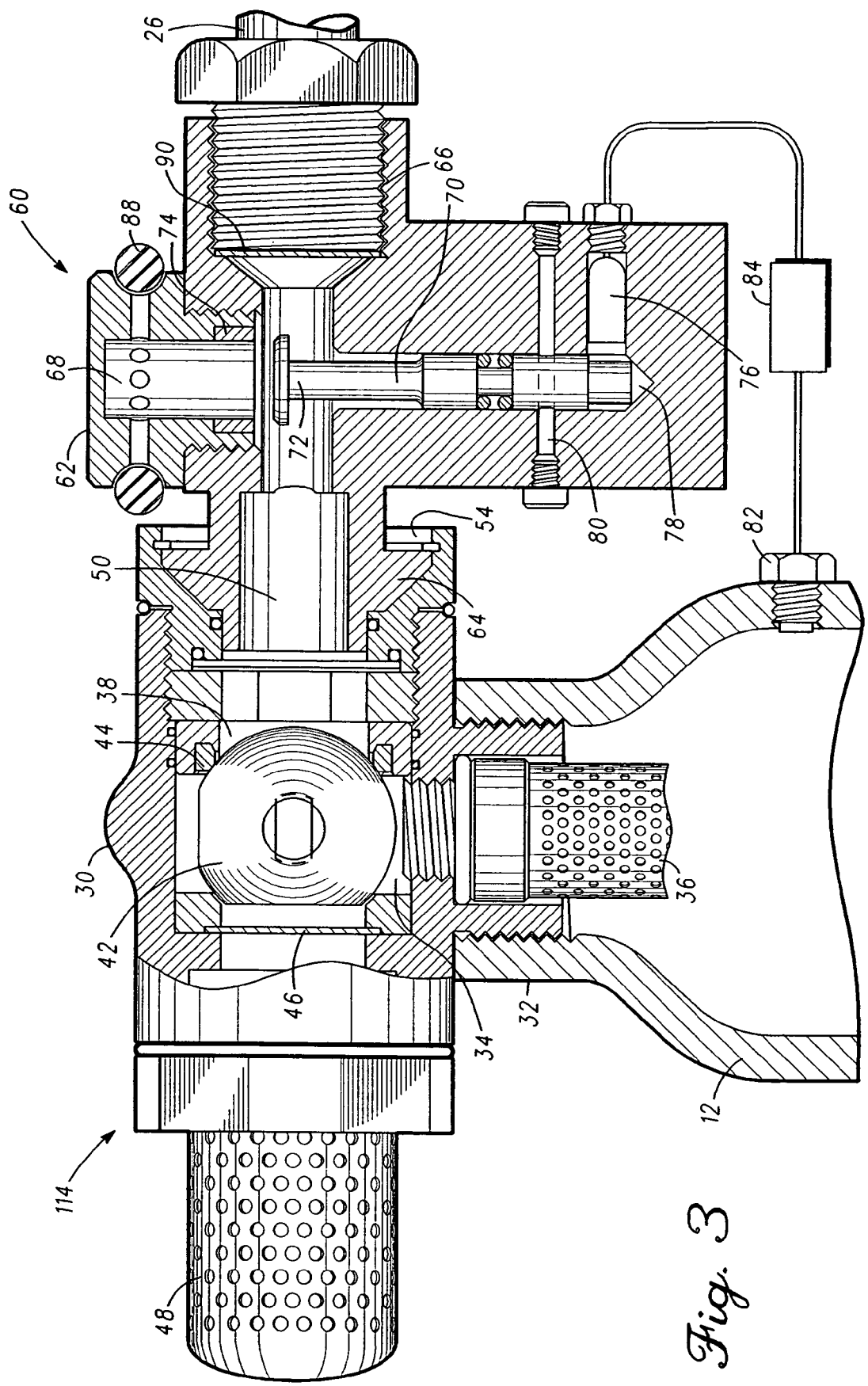
FIG. 3 is a cross-sectional view of alternative embodiment of a control valve for use in the evacuation slide system of FIG. 1.

With additional reference to FIG. 3, in an alternative embodiment of a control valve 114, first disk 52 which separates second chamber 38 from third chamber 50 in the embodiment of FIG. 2 is omitted in favor of an outlet port burst disk 90 separating third chamber 50 from primary outlet port 66. In operation, once primary valve 40 is opened, 100% of the inflation gas entering third chamber exits through gas relief outlet 68. After the predetermined period of time calculated to exhaust the correct amount of excess inflation gas has elapsed, control circuit 84 sends the signal to electro-explosive device 76, which causes normally-opened valve 70 to close. Pressure buildup in third chamber 50 then causes outlet port burst disk 90 to rupture allowing inflation gas to enter inflation line 26 to begin inflation of inflatable evacuation slide 16.

Although certain illustrative embodiments and methods have been disclosed herein, it will be apparent from the foregoing disclosure to those skilled in the art that variations and modifications of such embodiments and methods may be made without departing from the spirit and scope of the invention. For example although in the illustrative embodiment control valve 14 comprises valve body 30 and valve body 62, a unitary valve body incorporating the primary valve, secondary valve and gas relief outlet functions is considered within the scope of the present invention. Similarly, although the control valve 14 of the illustrative embodiment is electro-explosively actuated, the inflation system of the present invention is equally applicable to other inflation valves, including electrically and mechanically actuated valves. Similarly, although in the illustrative embodiment of FIGS. 1-2 sensor 82 monitors the pressure within pressure vessel 12, sensor 82 alternatively measures the height of the exit door in order to provide a signal to control circuit 84 indicative of whether an extensible slide should be deployed in the extended configuration in which an increased volume of gas is required, or in the retracted configuration where a lesser volume of gas is required. The valve may also be used in other applications in which the volume of gas needs to be varied such as rafts, pontoons and the like. Accordingly, it is intended that the invention should be limited only to extent required by the appended claims and the rules and principals of applicable law.

What is claimed is:

1. An inflatable aircraft evacuation slide system comprising:
    an inflatable evacuation slide stored in an undeployed condition;
    a source of inflation gas for inflating said inflatable evacuation slide;
    a control circuit; and
    a control valve, said control valve comprising;
        a valve body defining an interior chamber and an inlet port in fluid communication with said source of inflation gas,
        a primary valve member, said primary valve member disposed in a fluid path between said inlet port and said interior chamber, said primary valve member opening in response to an external signal to permit pressurized fluid to flow from said inlet port into said interior chamber,
        a primary outlet port having a first end opening into said interior chamber and a second end in fluid communication with said inflatable evacuation slide, and
        a gas relief outlet disposed in a gas flow path between said interior chamber and said inflatable evacuation slide, said gas relief valve having a vent port opening into a region external to said valve body, said gas relief outlet further comprising a normally-open valve, open to the vent port opening, and an actuator, said actuator responsive to a signal from said control circuit to move said normally-open valve into a closed position to close said vent port of said gas relief outlet.

2. The inflatable aircraft evacuation slide system of claim 1, wherein:
    said control circuit comprises a circuit providing a signal to open said primary valve and a time-delay circuit providing said signal to move said normally-open valve into the closed position a predetermined period of time after said primary valve opens.

3. The inflatable aircraft evacuation slide system of claim 1, further comprising:
    a sensor, said sensor providing an output signal indicative of the pressure of said source of inflation gas to said control circuit.

4. The inflatable aircraft evacuation slide system of claim 3, wherein:
    said sensor comprises a temperature sensor, wherein temperature measurement of said source of inflation gas is used as a proxy for a pressure measurement of said source of inflation gas.

5. The inflatable aircraft evacuation slide system of claim 3, wherein:
    said sensor comprises a sensor providing a signal for deploying an extensible evacuation slide in one of an elongated and a foreshortened configuration.

6. The inflatable aircraft evacuation slide system of claim 1, wherein said normally-open valve comprises:
    a valve member;
    a piston moveable between a first position and a second position, said piston acting on said valve member for moving said valve member from an open position to a closed position; and
    a chamber, said chamber being pressurized by said actuator to move said piston from said first position to said second position.

7. The inflatable aircraft evacuation slide system of claim 1, wherein:
    said normally-open valve further comprises a shear pin for holding said valve member in said open position.

8. The inflatable aircraft evacuation slide system of claim 1, further comprising:
    a secondary valve member disposed in a fluid path between said interior chamber and said primary outlet port, said secondary valve member opening in response to pressure in said interior chamber to permit pressurized fluid to flow from said interior chamber to said inflatable evacuation slide.

9. The inflatable aircraft evacuation slide system of claim 8, wherein:
    said secondary valve member comprises a burst disk.

10. The inflatable aircraft evacuation slide system of claim 8, wherein:
    said gas relief outlet is disposed in said gas flow path between said interior chamber and said inflatable evacuation slide downstream of said secondary valve member.

11. The inflatable aircraft evacuation slide system of claim 8, further comprising:
    an inflation hose leading from said control valve to an inlet port of said inflatable evacuation slide, wherein said gas relief outlet is disposed in a gas flow path between said secondary valve member and said inflation hose.

12. A method of inflating an aircraft evacuation slide comprising:
    providing an inflatable evacuation slide stored in an undeployed condition;
    providing a source of inflation gas for inflating said inflatable evacuation slide;
    providing a control circuit; and
    providing a control valve comprising a valve body defining an interior chamber, an inlet port, a primary valve member disposed in a fluid path between said inlet port and said interior chamber, a primary outlet port disposed in a fluid path between said interior chamber and said inflatable evacuation slide, and a gas relief outlet comprising a normally-open valve, open to the vent port opening, disposed in a fluid path between said interior chamber and a region external to said valve body;
    opening said primary valve member to permit a flow of inflation gas to flow from said source of inflation gas into the interior chamber of said valve body;
    venting a first portion of said flow of inflation gas through said gas relief outlet; and
    providing a signal from said control circuit to close said normally-open valve after a predetermined period of time, whereby a second portion of said flow of inflation gas is directed through said primary outlet port into said inflatable evacuation slide.

13. The method of claim 12, further comprising:
    sensing gas pressure in said source of inflation gas and providing a signal to said control circuit indicative of said gas pressure; and delaying said signal from said control circuit to close said normally-open valve based on the value of said signal to said control circuit indicative of said gas pressure.

14. The method of claim 12, further comprising:

sensing gas temperature of said source of inflation gas as a proxy for sensing pressure and providing a signal to said control circuit indicative of said gas temperature; and delaying said signal from said control circuit to close said normally-open valve based on the value of said signal to said control circuit indicative of said gas temperature.

15. The method of claim 12, wherein:

said normally-open valve is closed by an explosive actuator.

* * * * *